United States Patent [19]

Dalton

[11] 4,290,640
[45] Sep. 22, 1981

[54] EXTERNAL COVER FOR AN AUTOMOBILE ROOF HAVING A MOVABLE PANEL

[76] Inventor: Gerald P. Dalton, 2520 Buena Vista, Arlington, Tex. 76010

[21] Appl. No.: 107,360

[22] Filed: Dec. 26, 1979

[51] Int. Cl.³ .............................................. B60J 1/20
[52] U.S. Cl. ................................. 296/95 R; 296/216
[58] Field of Search ...................... 296/218, 95 R, 216

[56] References Cited

U.S. PATENT DOCUMENTS

| | | | |
|---|---|---|---|
| 2,643,912 | 6/1953 | Lyon | 296/95 R |
| 3,046,048 | 7/1962 | Cheney | 296/95 C |
| 3,140,115 | 7/1964 | Bliss | 296/95 R |
| 3,476,437 | 11/1969 | Schroeder | 296/218 |
| 3,876,245 | 4/1975 | Lowery | 296/95 R |
| 4,138,155 | 2/1979 | Chrysler | 296/218 |

Primary Examiner—Joseph F. Peters, Jr.
Assistant Examiner—John A. Carroll
Attorney, Agent, or Firm—Charles W. McHugh

[57] ABSTRACT

An external cover assembly for an automobile roof having movable panels (such as a so-called T-roof), including a flexible cover having a size which is adequate to completely overlay the movable panel and to extend slightly beyond the joints between the fixed and the movable portions of the roof. An anchoring means which may be a thin elongated member is connected to the flexible cover; it extends completely across the automobile's windshield and preferably is adapted to be wedged underneath the metal protective strip which constitutes a standard part of the windshield's mounting hardware. Ideally, such a thin elongated member is tapered in its transverse cross-section, and it has sufficient flexibility in a longitudinal direction as to be bent slightly in order to match the curvature of a modern windshield. Additional connecting means such as button snaps are provided for attaching the flexible cover to rigid portions of the roof along the sides and back of the cover. When the flexible cover is opaque, the cover provides protection against unwanted sunshine within the automobile as well as protection against unwanted rainwater.

13 Claims, 7 Drawing Figures

(STORAGE)

EXTERNAL COVER FOR AN AUTOMOBILE ROOF HAVING A MOVABLE PANEL

This invention relates generally to accessories adapted for attachment to automobiles, and more particularly it relates to a means for preventing water leaks through the roof of a vehicle having a movable panel—including an automobile having a so-called T-roof.

There are believed to be many persons who enjoy the open-air characteristics of a convertible and who were disappointed when the decision was made by U.S. automobile manufacturers to cease manufacturing convertibles. However, at least a partial substitute of those well-loved convertibles has made it possible for many buyers to enjoy some of the benefits that had been available in convertibles. This substitute construction is commonly known as a T-roof, because of the "T" shape which is formed by the forward portion of the roof (adjacent the windshield) and a longitudinally extending central beam that extends between the front and rear portions of the roof. Most such T-roof constructions include one or more removable panels, such that the driver can partially "open up" his automobile by removing and temporarily storing such panels. During inclement weather, the driver can restore his automobile to a more nearly weather-proof condition by replacing the panels in their "wells" and latching them into place, thereby re-establishing a relatively rigid roof. Regrettably, the characteristic of the removable panels that makes such a roof construction desirable (i.e., the panels are removable) also contributes to what seems to be an essentially universal complaint by owners: the roof leaks. And, while it may be possible to temporarily cure the problem of a roof leak for some period of time, the probability of re-occurrence of a roof leak is believed to be directly related to the number of times that a removable panel is temporarily taken off the automobile. Accordingly, there has remained a long-standing need for some way to reliably prevent leakage of rainwater, etc., through the joints around movable panels in an automobile roof; and, it is an object of this invention to provide such a solution to the leakage problem.

It is another object of this invention to provide an option for the operator of a vehicle with a T-roof that he has not previously enjoyed: to have the sun shine on his head or to block it off.

A further object is to provide an attractive appearance for an automobile by imitating, on a small scale, the appearance of a convertible top.

Still another object is to provide a low-cost, replaceable cover for at least a portion of an automobile's exterior covering, and including a construction which can be selectively installed and removed without the need for any tools.

These and other objects and advantages will be apparent from the description of a preferred embodiment of the invention (and several modifications thereof), and an examination of the attached drawing in which FIG. 1 is a perspective view of an automobile having a so-called T-roof with two removable panels, one of which is shown securely anchored to the fixed portions of the roof (on the "far" side), and the other panel being shown in a partially removed position;

Figure 6:
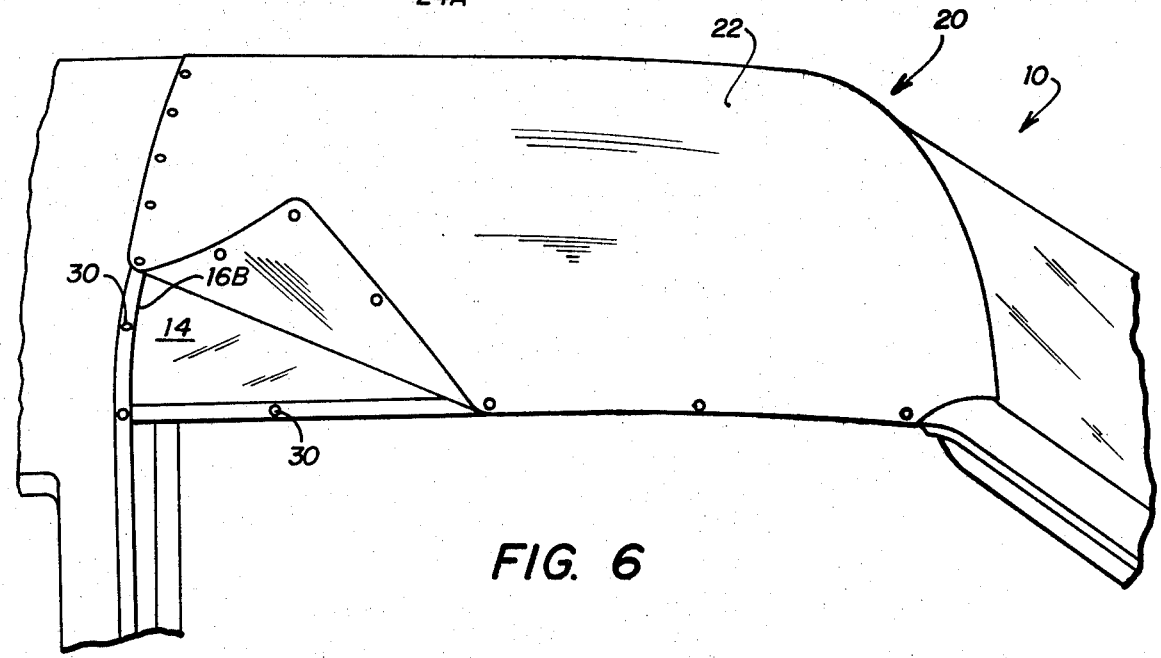
Figure 7:
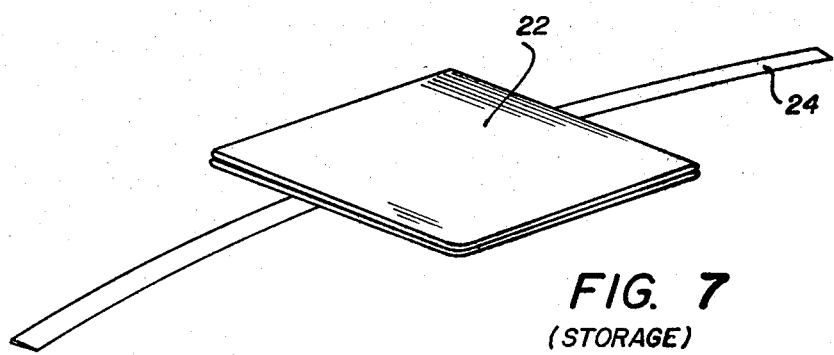

FIG. 6 is a perspective view of the top portion of an automobile on which the cover assembly has been almost completely secured for travel, with a small portion of the flexible cover being folded back over one of the panels (which, of course, constitutes a portion of the rigid roof); and FIG. 7 is a perspective view of a folded cover which has been temporarily separated from its associated elongated member—for storage.

In brief, the invention constitutes an external cover assembly for a portion of an automobile roof, including a flexible cover of water-proof material such as vinyl or the like. The cover has a size that is adequate to completely overlay that portion of an automobile roof having a movable panel. In the case of an automobile having a T-roof with two removable panels, the flexible cover is preferably large enough to completely shield both of the removable panels from the impact of rainwater. The flexible cover is also large enough to extend slightly beyond the joints between the fixed and the removable portions of the roof, so as to shield those joints when the cover is installed. The assembly also includes an anchoring device for selectively anchoring the leading edge of the cover to the automobile's roof—near the top edge of the automobile's windshield. In one embodiment, the anchoring device constitutes an elongated, thin member that is permanently attached to the leading edge of the cover; the member is sufficiently thin so that it may be manually wedged underneath the metal strip which typically covers the top edge of the windshield. Suitable connectors such as snap connectors are distributed around the sides and the rear edge of the cover, so as to hold the cover firmly next to the roof and prevent the wind or ram air from lifting the cover; the result is that water which might otherwise reach the joints around the removable panels flows harmlessly off the vehicle. When it is desired to remove the panels from the roof, the snaps holding the cover are first pulled free and then the elongated member is gently pulled in a forward direction so as to draw it out from under the metal strip that is permanently affixed to the vehicle's body. The flexible cover is then completely separated from the automobile, and it can be stored at any convenient location until such time as the driver wishes to again cover his roof panels.

Figure 1:
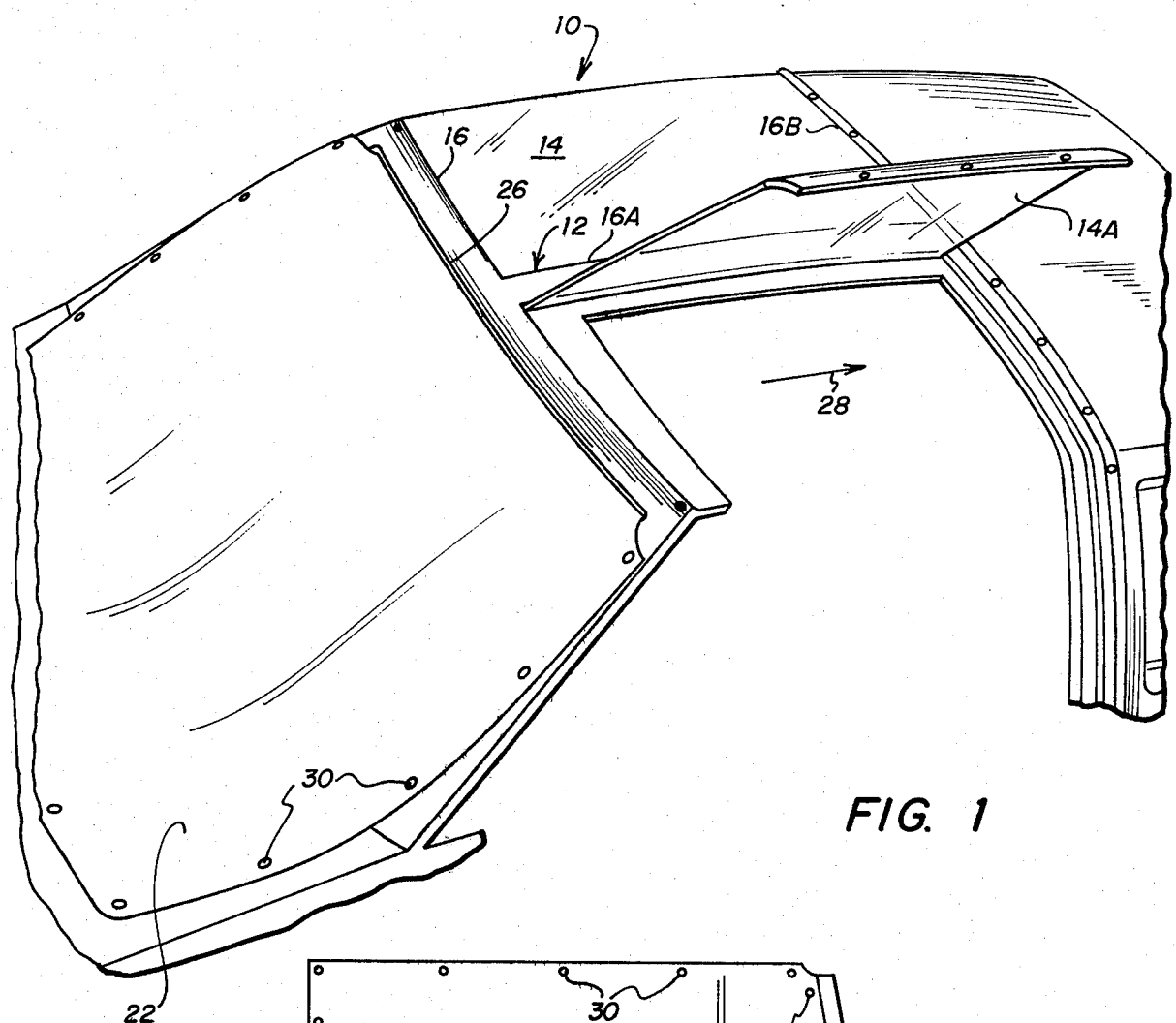

Referring initially to FIG. 1, an exemplary automobile 10 having a T-roof 12 with removable panels 14, 14A is shown. The first panel 14 is shown in the position it would occupy if it was securely latched to the fixed portions of the roof. The other panel 14A is shown in an intermediate position which it would occupy if a person was manually removing the panel from its "well" within the fixed parts of the roof. (The person who would have to hold the panel 14A in this unstable position is, of course, not shown in this figure.) Around the panels 14, 14A are joints 16, 16A, 16B which are typically very hard to seal on a permanent basis—especially if the panels 14, 14A are routinely installed, removed, reinstalled, etc.

Figure 2:
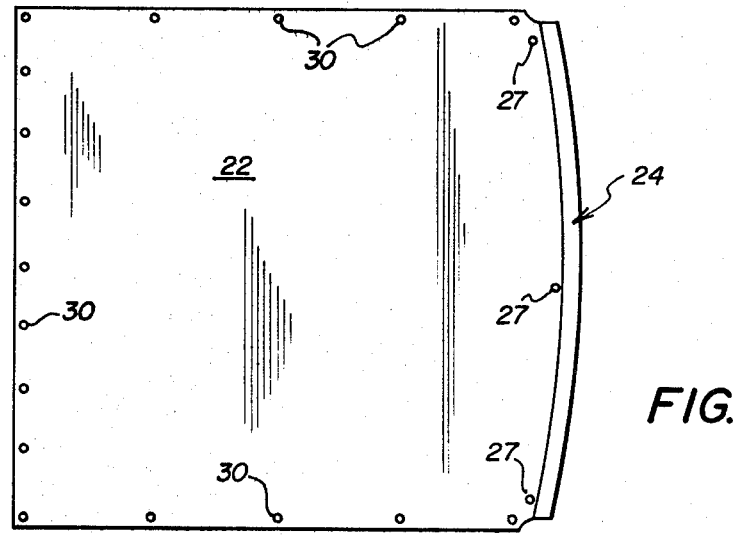
FIG. 2 is a top, plan view of a cover assembly which is sized so as to cover both of the removable panels of a roof as shown in FIG. 1, including an elongated member connected to the leading edge of the cover and having a length which is essentially as great as the full width of the automobile's windshield.
Figure 3:
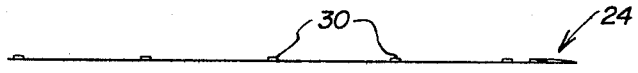
FIG. 3 is a side, elevational view of the cover assembly shown in FIG. 2, with the elongated member being shown straight in this view—whereas it was slightly bent in FIG. 2.

Also shown in FIG. 1 in its partially installed position is a cover assembly 20 having a flexible cover made of vinyl cloth or the like, and the cover having a size which is adequate to completely overlay that portion of the roof having removable panels. Referring additionally to FIGS. 2 and 3, the assembly 20 includes an anchoring means for selectively anchoring the leading edge of the cover 22 to the automobile's roof—preferably near the top edge of the automobile's windshield. Such an anchoring means ideally constitutes an elongated and thin member 24 having sufficient rigidity as to resist any significant bending about its longitudinal axis—but having sufficient flexibility as to permit some bending about a transverse axis. It is this bending about a transverse axis that permits the elongated member 24 to conform to the curvature of a modern curved windshield. The inability to bend about its longitudinal axis means that the elongated member 24, when wedged under the lip of a metal protective strip 26, cannot be pulled upward by a tension load in the direction represented by arrow 28. Thus, after the cover 22 is manually pulled back over the panels 14, 14A and secured, any wind loads on the cover assembly 20 when the automobile travels down a highway will not dislodge the assembly.

Figure 4:
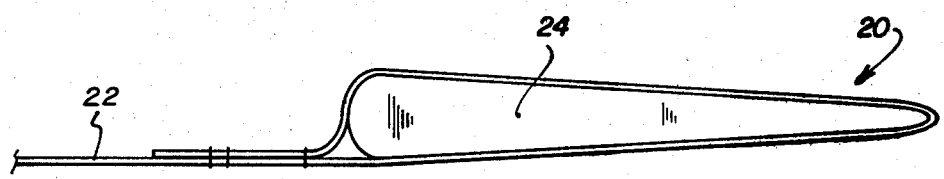
FIG. 4 is an enlarged fragmentary view of the leading edge of a cover assembly as represented in FIG. 2, with the end of an elongated member being visible through the open end of a "pocket" in the cover.

A suitable material for the elongated member 24 is a thin, plastic rail having at least one very thin edge—so as to foster the easy installation of the cover assembly 20 without the need for any special tools. When that edge of the elongated member 24 which is remote from the main body of the flexible cover 22 is very thin, it is easier to slide the member under the protective strip 26 which hides the top of the windshield. The "near" edge of the elongated member 24 (i.e., the edge which is closer to the main body of the flexible cover 20) is preferably relatively thick, because the cover 22 wraps around this edge as it is pulled backwardly over the panels 14, 14A. Thus, as one way of avoiding undue stress on the cover 22, a thick edge is provided—with ample radii on its corners (so that the edge may be accurately categorized as rounded). In the preferred embodiment, therefore, the cross-sectional shape of an elongated member 24 (as measured in a transverse direction) is not uniform; rather, one edge is thicker than its opposite edge, as shown in FIG. 4.

Another embodiment of a front anchoring means is a strip of heavy cardboard, often called tack strip, which is commonly used in the upholstery trade. An appropriate size for such tack strip is about one-half inch wide and about one-sixteenth inch thick, which is very readily stapled to the leading edge of a vinyl cover 22 in order to give it the "body" which is necessary to wedge under the metal strip 26.

Figure 5:
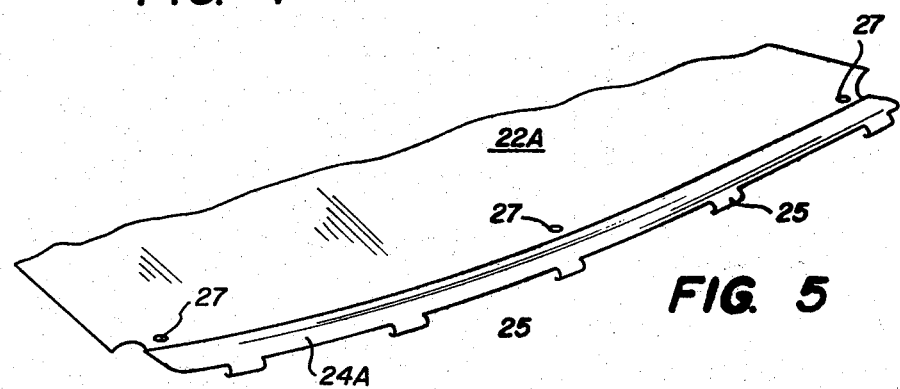
FIG. 5 is a fragmentary perspective view of an alternate embodiment of the invention which includes an elongated member that is permanently connected to a flexible cover.

If the principle of the invention is to be applied to a vehicle that does not have an adequate overhanging lip on the metal strip 26, an exposed member 24A (FIG. 5) may be employed to engage the rubber grommet that surrounds the windshield. A few curved hooks 25 depend from the front edge of the member 24A, and these hooks are adapted to be gently forced against the top of the windshield grommet in order to anchor the leading edge of the cover 22A and prevent ram air from forcing its way under the cover. It is also advantageous to provide a few button connectors 27 to help hold down the leading edge of the cover 22A, and to insure that the hooks 25 are kept tightly engaged with the windshield grommet. When installed, this member 24A rests on top of any metal trim above the windshield, but it is advantageously covered by a portion of the cover 22A—so only small portions of the hooks 25 would be in any way visible. This particular embodiment of a leading-edge anchoring means shares many of the characteristics of the embodiment shown in FIG. 4: it is easily connected to a vehicle by an operator without any special tools, it does not detract from the cosmetic appearance of the vehicle either when it is installed or removed, and it provides the amount of rigidity that is necessary at the leading edge of the cover (so that the cover does not tend to behave like a parachute).

Also provided around the back and side edges of the cover 22 are button snaps or other connecting means 30 which are used to secure the cover to rigid portions of the roof. With snap-type connectors (wherein a male element is permanently affixed to the roof and a mating female unit is fixed to the cover), the cover assembly 20 may be quickly and easily anchored over the removable panels with only a modest amount of manual pressure. Such button snaps 30 are shown in FIG. 6, wherein they are spaced approximately five or six inches apart around that portion of the roof that is to be covered by the assembly 20. A small portion of the cover 22 is shown in this figure as folded back in order to reveal a segment of one of the removable roof panels. Although it may not be fully apparent from this particular illustration, the removable panels of a typical T-roof are at least partially transparent—constituting heavily tinted glass or plastic. And, persons who have ridden in such automobiles on a hot, summer day can testify that the presence of the sun can definitely be sensed through the panels. Indeed, a bald man could receive a sunburn while traveling in such an automobile on a sunny day. Of course, if the sun's rays can be readily sensed on a person's skin, it should be manifestly apparent that the vehicle's interior is being heated by the radiation coming through the substantially transparent panels. Accordingly, one distinct advantage of the invention described herein is realized when the installed cover 22 is opaque, such that it provides shade for the automobile's interior. A transparent cover 22 made from a flexible vinyl material could be substituted for an opaque cover when a person wishes to merely avoid water leakage through the roof and does not wish to also obtain shade.

The cover 22 can be made to be cosmetically pleasing by matching the color of the fixed portions of the automobile roof. And, if the cover material is a textured vinyl, the overall appearance of the installed cover 22 can be made to approximate that of a conventional vehicle having a solid roof covered with vinyl. The cover 22 can also be made to simulate the appearance of a traditional "convertible". In any event, the cosmetic appearance of an automobile will usually not be degraded by installation of the assembly 20, and in most cases it will be enchanced by use of the invention.

Referring still to FIG. 6, when a person chooses to remove the cover assembly 20 from the roof of his vehicle, he would merely pull on the cover assembly until he separated the mating parts of the button connectors 30; eventually the cover 22 will be completely loose, except for the restraint provided by the engaged member 24. The assembly 22 would then be pulled gently in a downward and forward direction (toward the front bumper) until the elongated member 24 became separated from the protective strip 26. If the member 24 is selectively removable from the cover assembly 20—by withdrawing it out of one end of an elongated pocket in the cover 22, the cover may then be folded for easy storage within the automobile, as suggested by FIG. 7. When it is desired to re-install the assembly 20, a person need only slide the thin member 24 back into the prepared pocket—and it will be effectively "connected" to the cover 22. Of course, when inserting a tapered member 24 into a prepared pocket along the edge of cover 20, a person must remember that the thin, pointed edge of the elongated member should be oriented away from the main body of the flexible cover. Otherwise, it would be very difficult to wedge the elongated member 24 under the automobile's protective strip 26. A cover which is permanently connected to its elongated member would naturally be stored temporarily by rolling the cover around the elongated member in the manner of a well-known window shade.

It should be apparent that the construction disclosed herein could be readily adapted for any vehicle having a roof with movable panels, including a vehicle with a so-called moon roof, sun roof, sky roof, etc. Any smooth roof construction which is vulnerable to water leaks can be easily and economically protected with the cover assembly described herein. All that is necessary is that the cover have a size so as to completely overlay the joints between the fixed portions and the movable panel. And, while only a few embodiments of the invention have been disclosed herein, it should be apparent to a person skilled in the art that modifications can be made without departing from the essence of the invention which has been described and is hereafter claimed.

What is claimed is:

1. An external and supplemental cover assembly adapted for full-time use on an automobile, including those times when the automobile is being driven such that wind-related forces are present, comprising:
   (a) a flexible cover adapted for selective attachment to an automobile roof so as to lie in intimate contact with said roof, and the cover having a size which is adequate to completely overlay that portion of an automobile roof having one or more movable panels, and the cover being sized to extend slightly beyond the joints between the fixed and the movable portions of the roof so as to cover those joints when the cover is installed;
   (b) anchoring means adapted for selectively anchoring the leading edge of the cover to the roof near the top edge of the automobile's windshield, and said anchoring means being effective to prevent air from being forced between the flexible cover and the automobile roof as the automobile is being driven; and
   (c) mechanical connecting means adapted for selectively connecting the side and rear edges of the cover to rigid portions of the roof so as to hold the cover firmly next to the roof and thereby prevent falling rain from striking the joints between the movable and fixed portions of the roof.

2. The cover assembly as claimed in claim 1 wherein the anchoring means includes an elongated and thin member having a length approximately as great as the width of the automobile's windshield, and the elongated member being semi-rigid so as to resist any significant bending about its longitudinal axis while permitting at least some bending about its transverse axis, in order to permit the elongated member to conform to the curvature of a curved windshield.

3. The cover assembly as claimed in claim 2 wherein the elongated member has a length which is essentially as great as the full width of the windshield.

4. The cover assembly as claimed in claim 2 wherein the elongated member is sufficiently thin as to be inserted without tools under the standard protective strip that covers the top edge of an automobile windshield.

5. The cover assembly as claimed in claim 2 wherein the cross-sectional shape of the elongated member as measured in a transverse direction is not uniform, and one edge is thicker than the opposite edge.

6. The cover assembly as claimed in claim 5 wherein the thick edge of the elongated member is bounded by ample radii on its corners so that it may be accurately characterized as rounded, and the thin edge may be reasonably described as pointed.

7. The cover assembly as claimed in claim 6 wherein the thin edge of the elongated member is more remote and the thick edge is closer to the main body of the flexible cover.

8. The cover assembly as claimed in claim 2, wherein the elongated member is permanently connected to the flexible cover.

9. The cover assembly as claimed in claim 2 wherein the elongated member is selectively attachable to the cover to permit the installation of the cover over the automobile roof, and the elongated member is removable from the cover so that the cover may be folded for storage.

10. The cover assembly as claimed in claim 1 wherein the connecting means includes snaps that are placed every few inches around the rear and sides of the flexible cover.

11. The cover assembly is claimed in claim 1 wherein the cover is made of a vinyl cloth.

12. The cover assembly as claimed in claim 1 wherein the flexible cover is opaque, whereby the cover provides shade for the automobile's interior when the cover is installed.

13. An external and supplemental cover assembly adapted for use on a full-time basis on an automobile having a T-roof with two removable panels, comprising:
   (a) a flexible cover of water-proof material having a size which is adequate to completely overlay that portion of an automobile roof having the two removable panels, and the cover being adapted to lie in intimate contact with the automobile roof and to extend slightly beyond the joints between the fixed and the removable portions of the roof, whereby the cover will shield those joints when the cover is installed over the panels;
   (b) anchoring means secured to the cover for selectively anchoring the leading edge of the cover to the automobile roof near the top edge of the automobile's windshield, and said anchoring means including an elongated and thin member which is semi-rigid so as to resist any significant bending about its longitudinal axis while permitting slight bending about its transverse axis, in order to permit the elongated member to conform to the curvature of a curved windshield, and said anchoring means being adapted to bear against the automobile so as to preclude the entrance of ram air under the flexible cover when the automobile is being driven; and (c) connecting means for selectively connecting the sides and the back of the flexible cover to rigid portions of the roof so as to hold the cover firmly next to the roof and thereby prevent falling rain from striking the joints between the removable and the fixed portions of the roof, and said connecting means including at least some snap fasteners.

* * * * *